United States Patent Office 2,861,902
Patented Nov. 25, 1958

2,861,902

ADDITION PRODUCTS OF HETEROCYCLIC NITROGEN POLYMERS AND HEAVY METAL SALTS, METHOD OF IMPREGNATING WITH, AND IMPREGNATED ARTICLE

James E. Pritchard, Bartlesville, Okla., assignor to Phillips Petroleum Company, a corporation of Delaware No Drawing. Application September 7, 1954
Serial No. 454,615

23 Claims. (Cl. 117—138.5)

This application is a continuation-in-part of Serial No. 329,450, filed January 2, 1953, and now abandoned, same assignee.

This invention relates to reaction products of heterocyclic nitrogen base polymers and salts of heavy metals having fungicidal and/or insecticidal properties, the preparation of such products, and their use in rendering textiles and other absorbent materials waterproof and resistant to the attack of insects, larvae, fungi, bacteria and other parasitic micro-organisms. In a further aspect the invention relates to water repellent absorbent materials which are resistant to attack by the aforesaid organisms.

Absorbent materials such as textiles, paper, wood, hair, leather, fur, and the like are frequently damaged by bacteria, fungi, insects and their larvae, etc. Many methods of treatment have been proposed by which such materials can be rendered resistant to these agents, but all leave something to be desired. For example, it is well known that salts of heavy metals will, when applied to textiles, render them resistant to mildew and similar parasitic micro-organisms; but because of the ease with which these salts are removed from the fabric upon exposure to moisture and weather conditions, the effect is not lasting during service conditions. The conventional solution to problems of this type has been to first treat the material with a fungicide or other parasiticide of this type and then to apply an organic compound which will bind the fungicide to the material and render the latter waterproof. A class of impregnants has now been discovered which combines these two functions in one treatment.

It is an object of this invention to provide compounds which, when applied to an absorbent surface such as textiles, render the latter waterproof and resistant to parasiticidal organisms. A further object is to provide a method of preparing such compounds. An additional object is the provision of a method of impregnating a textile or other absorbent material with such compounds. Another object is the provision of textile fibers and other absorbent materials which are rendered water repellent and resistant to attacks of fungi, bacteria, insect larvae, etc.

In accordance with this invention it has been found that compounds formed by the reaction of heterocyclic nitrogen base polymers with metal salts having fungicidal and insecticidal properties unexpectedly retain the fungicidal and insecticidal properties of the metal salts. Fibers impregnated with these polymeric salts retain them during exposure to moisture and weather conditions for a much longer period of time than they would retain the metal salts alone. In addition these impregnants impart to the fiber a high degree of water repellency and are not removed during laundering and dry cleaning of the fibers. These impregnants are easily applied, requiring only drying after application and do not require a special heat treatment to insure a permanent finish.

Because they impregnate the fibers instead of forming a coating on the surface of the treated material they are preferred over many types of coatings which tend to break up or crack and which are therefore less permanent. These compositions can be used as unsupported films suitable for use as wrapping materials or as treating agents for absorbent material which is subject to attack of the type described. The preferred metal salts are those of mercury, copper, and zinc. Other salts which are operative are those of barium, lead, bismuth, iron, cobalt, nickel, silver, gold, tin, arsenic, antimony, cadminum, and chromium.

The metal salts may be of the simple inorganic type, for example, chromic sulfate, cupric sulfate, cupric chloride, cadmium chloride, zinc chloride, mercuric chloride, mercuric nitrate, etc. These salts are water soluble and can, therefore, be employed for reactions in aqueous solutions. Organic salts which are operative include the metal salts of saturated and unsaturated aliphatic carboxy acids, saturated and unsaturated alicyclic carboxy acids, and aromatic carboxy acids, the total number of carbon atoms in the acid not exceeding 20. Both mono- and dibasic acids are suitable. When the metal salt is not water soluble, it is dissolved in an organic solvent and the resulting solution employed in the reaction with the polymer of the pyridine derivative, since it is generally more desirable to effect these reactions in solution.

New compositions of this invention are prepared from polymers of heterocyclic nitrogen bases of the pyridine and quinoline series containing a vinyl or alpha-methylvinyl group. Homopolymers, copolymers, terpolymers, etc., all produce valuable products. Monomers copolymerizable with these heterocyclic nitrogen bases include compounds containing an active $CH_2=C<$ group. Examples of such compounds which are widely used include styrene; substituted styrenes, such as alkyl, alkoxy, and halogen-substituted styrenes; acrylonitrile; methacrylonitrile; methyl acrylate; methyl methacrylate; ethyl acrylate; butyl acrylate; conjugated dienes, and the like. Also, polymers can be prepared from various mixtures of these heterocyclic nitrogen bases containing a vinyl or alpha-methylvinyl group, one or more conjugated dienes, and one or more polymerizable materials containing the vinyl or alpha-methylvinyl group set forth above.

The polymeric starting materials can range from liquid to rubbery to solid resinous materials, depending upon the monomers employed and the method of preparation. For example, copolymers of a conjugated diene with a vinyl-pyridine, when prepared by emulsion polymerization, can range from liquid to rubbery products, depending upon the amount of modifier employed in the polymerization recipe.

The heterocyclic nitrogen bases which are applicable for the production of the polymeric starting materials are those of the pyridine and quinoline series which are copolymerizable with a conjugated diene and contain at least one

substituent wherein R is either hydrogen or a methyl group, i. e., the substituent is either a vinyl or an alpha-methylvinyl (isopropenyl) group. It is preferred that only one substituent of this type be present and that pyridine be the base instead of quinoline. Various alkyl-substituted derivatives are also applicable but it is preferred that the total number of carbon atoms in the nuclear substituted alkyl groups not exceed 12 and that the alkyl substituents be methyl and/or ethyl.

The heterocyclic nitrogen bases are those having the formula

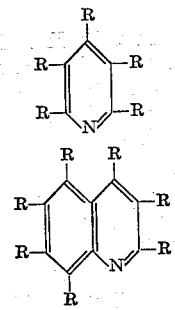

or

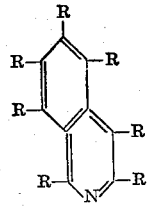

where R is selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and alpha-methylvinyl; and the total number of carbon atoms in the group being not over 12, in addition to those carbon atoms in the vinyl and/or alpha-methylvinyl groups. Examples of such compounds are 2-vinylpyridine; 2-vinyl-5-ethylpyridine; 2,5-divinylpyridine; 2-methyl-5-vinylpyridine; 4 - vinylpyridine; 2,3,4 - trimethyl - 5 - vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl - 4,5 - divinylpyridine; 2,4 - dimethyl - 5,6 - dipentyl-3-vinylpyridine; 2-decyl-5(alpha-methylvinyl) pyridine; 3,5-di(alpha-methylvinyl) pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl - 5 - ethoxypyridine; 2 - vinyl - 4,5 - dichloropyridine; 2 - (alpha - methylvinyl) - 4 - hydroxy - 6 - cyanopyridine; 2-vinyl-4-phenoxy-5-methylpyridine; 2-cyano-5-(alpha-methylvinyl) pyridine; 3-vinyl-5-phenylpyridine; 2-(para-methylphenyl)-3-vinyl-4-methylpyridine; 3-vinyl-5-(hydroxyphenyl) pyridine; 2-vinylquinoline; 2-vinyl-4-ethylquinoline; 3 - vinyl - 6,7 - di - n - propyl - quinoline; 2 - methyl - 4 - nonyl - 6 - vinylquinoline; 4(alpha - methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2 - vinyl - 6 - ethoxy - 7 - methylquinoline; 3 - vinyl-6-hydroxymethylisoquinoline; and the like.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes, are also applicable. In fact, it has been found that when dealing with fabrics such copolymers are more water repellent than the homopolymers described above. The explanation is that the heterocyclic nitrogen bases are water-soluble whereas such olefins as butadiene are water-insoluble. Hence, the higher the content of heterocyclic base in relation to diolefin the greater the water-solubility of the polymer, and hence the lower is its water-repellency. Conversely, the greater the ratio of diolefin to heterocyclic base the greater the water-repellency of the polymer. The conjugated diene component of the copolymer not only imparts water-repellency, but also gives greater flexibility, while the pyridine or quinoline derivative imparts low oil solubility to the product. I use from 25 to 75 parts by weight of the conjugated diolefin and from 75 to 25 parts by weight of the heterocyclic nitrogen base per 100 parts by weight total monomers. A specific example of a copolymer which imparts excellent water repellency characteristics to a fabric is a 50/50 butadiene/2-methyl-5-vinylpyridine copolymer.

Preferred pyridine derivatives are 2-methyl-5-vinylpyridine, 2-vinyl-5-ethylpyridine, and 2-vinylpyridine. Using the first of these compounds, 2-methyl-5-vinylpyridine, the homopolymer has this structure:

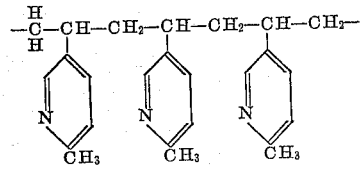

and poly-2-vinylpyridine, this structure:

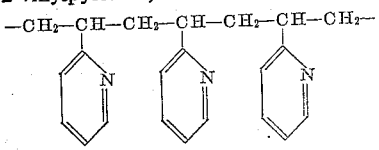

The polymeric mercury and zinc metal salts of this invention are of two types and I believe that the particular product obtained is dependent upon the method by which the reaction is carried out. In one of these products the metal atom of the salt is attached to the nitrogen atom of the pyridine nucleus. To illustrate these compounds only a pyridine nucleus will be illustrated but it is to be understood that the balance of the polymer is present. Further, it should be understood that not every pyridine nucleus need be reacted with the particular salts, but that only a portion of these pyridine nuclei need have the salt reacted therewith. On this basis, illustrative types of compounds are:

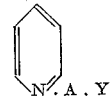

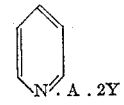

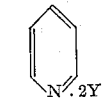

and

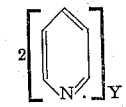

where Y is a salt of a metal as defined above with an inorganic acid or an organic acid containing no more than 20 atoms and A is the acid. Specific examples are:

Zn(C₂H₃O₂)₂

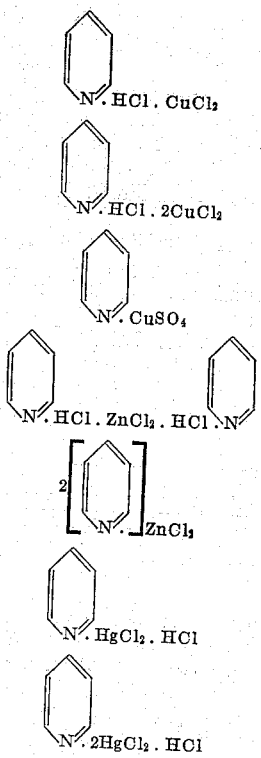

It is not intended, however, that the invention be limited to compounds represented by these particular formulas. Compounds of a different type may also be present. The pyridine nucleus in the vinylpyridine polymer behaves similarly to pyridine.

It the second group of products the metal atom of the salt is attached to a carbon atom of the pyridine nucleus. Zinc and mercury salts may be linked in this manner instead of being linked to the nitrogen atom of the pyridine. Examples of this are polymeric mercuric acetate and polymeric zinc acetate:

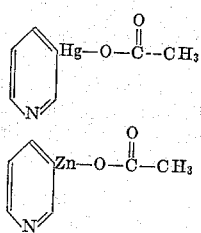

While the amount of metal in the polymeric salt may vary between wide limits the lower limit should be at least 5% to avoid having to apply an excessive amount of polymeric salt to fabrics to obtain the necessary fungicidal effect.

As stated above the determination of which of these two types of compounds is formed depends on how the reaction between the polymer and the metal salt is effected. Taking mercury as an example, the method of forming the two types of polymer will now be discussed. To distinguish the two products, the one in which the mercury atom is attached to a carbon atom of the pyridine nucleus will be referred to as a "mercurated polymer." The other type wherein the mercury salt is attached to the nitrogen atom of the pyridine nucleus will be referred to as a "mercury complex."

Whether a nuclear substituted product or a polymeric complex compound is formed by reaction of the polymer with the mercuric salt depends largely upon the method of preparation employed. For the preparation of mercurated compounds, i. e. nuclear substituted products, an acid solution of the polymer is treated with mercuric acetate and the reaction mixture is maintained at a temperature in the range of 20° to 100° C. for a period in the range of 1 minute to 24 hours, preferably 15 minutes to 2 hours. The time required is dependent upon the compounds reacted and the reaction temperature. For this reaction the polymer is generally dissolved in acetic acid and the mercuric salt, also in solution, is added to the solution of the polymer. When a mercurated product other than the acetate is desired, the acetate is generally prepared first and, by treatment with a suitable reagent, the acetate is converted to the desired product. For example, the acetate may be treated with sodium chloride or sodium nitrate to yield the chloride, e. g.

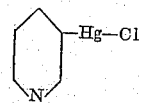

or nitrate, e. g.

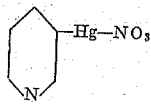

Treatment with an organic acid, or the sodium salt thereof, converts the acetate to the salt of the corresponding acid. Mercurated polymers are precipitated from the reaction medium by the addition of an alkaline treating agent such as an alkali metal hydroxide, carbonate or bicarbonate.

For the preparation of a complex salt of the polymer, such as is formed by reaction of the nitrogen atom of the pyridine nucleus with a mercuric salt, mercuric chloride is generally preferred. The polymer is dissolved in an acid, such as hydrochloric acid, and this solution is contacted with the mercuric salt solution. These polymer complex compounds are generally of a very limited solubility in the reaction medium and, therefore, precipitate as they are formed.

The action of zinc salts is analogous to that of mercury, i. e. the zinc acetate attaches to a nuclear carbon whereas the zinc chloride attaches to the nitrogen atom of the pyridine nucleus.

When an aqueous acid solution of the pyridine derivative polymer is prepared prior to reaction with a metal salt, the acid solution of the desired concentration is frequently prepared first, the polymer is then added, and the mixture is agitated to facilitate solution. Sometimes a more concentrated solution of acid is prepared first and the solution diluted to the desired concentration after the polymer is dissolved. In instances where an acid such as acetic acid is used, the polymer can be treated with the concentrated acid and the mixture diluted prior to use. Regardless of the acid concentration employed the polymer dissolves with the formation of a pyridinium salt. Solvation of the polymeric material can in some instances be obtained when only one-fourth of the stoichiometric equivalent of acid to basic units in the polymer is used but larger amounts of acid, even up to several chemical equivalents, can be used. The amount of acid is governed, at least partially, by the type of polymer employed since the pyridinium salts of the polymer must be acid-soluble, in preparing an acid solution of a copolymer of 1,3-butadiene and 2-methyl-5-vinylpyridine, the content of butadiene should not exceed 75 parts by weight, this being about the border line of acid solubility. As previously stated a 50/50 mixture is preferred.

Acids which are applicable are those which possess sufficient water solubility to give solutions of the desired concentration. Both saturated and unsaturated aliphatic monobasic and dibasic organic acids can be employed as well as mineral acids. Examples of acids in which heterocyclic nitrogen base polymers can be dissolved include formic, acetic, propionic, butyric, oxalic, malonic, maleic, succinic, glutaric, glycolic, hydrochloric, sulfuric, nitric, and phosphoric. The acidity of the vinylpyridine polymer solutions is regulated so that the fabrics being treated will not be harmed. The pH is preferably in the range from 2 to 6.

The metal salt complex of the heterocyclic nitrogen base can be applied to the fabric in various ways. In one method of operation, the fabric is immersed in an aqueous acidic solution of the polymer. It is then squeezed or centrifuged to remove excess moisture, followed by immersion in an aqueous solution of a salt, whereupon the insoluble complex precipitates on and/or in the fabric. This is followed by rinsing with either water or with a dilute base to remove combined acid. When the salt complex is soluble in the acidic aqueous medium, the fabric must be immersed in a solution of a basic material such as an alkali metal hydroxide, an alkali metal carbonate, or bicarbonate to precipitate the polymer-salt complex before rinsing and drying the fabric. The alkaline treating solution should be of such concentration that it will not harm the material being treated. Preferably a concentration not greater than one percent by weight is employed, or expressed in other terms, a 0.01 to 0.25 normal solution.

In a specific embodiment of the invention, the first solution comprises an aqueous acetic acid solution of a copolymer of butadiene with 2-methyl-5-vinylpyridine, and the second solution comprises an aqueous solution of zinc acetate. Immersion in an alkaline bath is then necessary to cause precipitation of the complex.

When it is desired to impregnate an absorbent material with a mercurated product, such as the mercuric acetate derivative of the polymer, it is convenient to prepare a solution of the mercurated compound by adding an aqueous solution of mercuric acetate to an acetic acid solution of the polymer and maintaining the mixture for a time and at a temperature to yield the nuclear-substituted product. The fabric is immersed in this solution, squeezed by passing it through rollers or by other suitable means to remove excess solution, and then washed with a solution of a basic material such as the above mentioned alkali metal hydroxide, carbonate or bicarbonate. This treatment causes the mercurated polymer to be precipitated in the fabric. The fabric is then rinsed with water to remove excess basic solution and dried.

When it is desired to produce a fabric impregnated with the mercuric complex of the polymer, the absorbent material is first immersed in an aqueous acid solution of the polymer until it becomes saturated. Then excess solution is removed by passing the material between rollers or by other means, and then the absorbent material is immersed in an aqueous solution of a mercuric salt which forms an insoluble complex with the polymer, for example, mercuric chloride. Since the polymer mercuric salt complex is insoluble, the complex is precipitated in the absorbent material, after which excess mercuric salt solution is removed by squeezing and the impregnated material is dried.

Production of absorbent material impregnated with a mercurated polymer other than the acetate is accomplished by contacting the acetate with the desired reagent before impregnating the absorbent material. An alternative method is to impregnate the material with the acetate and then convert the treating agent to the desired mercurated compound before washing the material with the alkaline solution.

Instead of employing aqueous solutions of the metal salts and aqueous acid solutions of the polymers, as described above, other solvents can be used. Any solvent which is a solvent for both the polymer and the metal salt but is a non-solvent for the reaction product is applicable, e. g. alcohols, ethers, and hydrocarbons. In such cases either the polymer or its acid salt can be used. The metal salt can be dissolved in alcohol and the polymer can be dissolved in a mixture of an alcohol and an aqueous acid solution.

In general, fabric is impregnated with the polymer metal salt compositions in amounts ranging from 0.1 to 25 parts of the treating agent per 100 parts of the material treated, preferably from 0.5 to 5 parts by weight. The amount of treating agent applied to a fabric is dependent upon the type of fabric treated and the ultimate use.

Having thus outlined the objects and principles of my invention, the following exemplifications thereof are furnished for the purposes of illustration and not in limitation.

Poly-2-methyl-5-vinylpyridine (I) and a butadiene/2-methyl-5-vinylpyridine copolymer (II) were prepared by emulsion polymerization at 50° C. in accordance with the following recipes:

TABLE A

| | Parts by Weight | |
|---|---|---|
| | I | II |
| 2-Methyl-5-vinylpyridine | 100 | 50 |
| 1,3-Butadiene | | 50 |
| Water | 180 | 180 |
| Soap flakes (sodium fatty acid soap) | 5 | 5 |
| $K_2S_2O_8$ | 0.3 | 0.3 |
| Mercaptan blend [1] | 0.3 | 0.3 |

[1] A blend of tertiary $C_{12}$, $C_{14}$, and $C_{16}$ aliphatic mercaptans in a ratio of 3:1:1 parts by weight.

The latex was shortstopped at an average conversion of 68% with 0.1 part di-tert-butyl hydroquinone. As an antioxidant 2% by weight of phenyl-beta-naphthaylamine based on the weight of the polymer was added. The brine-alcohol method of coagulation was used; then the polymer was washed free of soap and dried.

Samples of 10-ounce cotton duck which had been laundered and dry cleaned to remove any sizing or finishing oils were treated in various ways as hereinafter described. One untreated sample was reserved as a control. After treatment, the samples were subjected to tests to determine their resistance to fungi and other microorganisms and to weathering by atmospheric conditions. Water repellency was also determined on some of the samples.

Soil burial test

In this test, fabric was buried for 30 days at room temperature in moist soil of the type capable of supporting good plant growth. Such soil contains among other microorganisms cellulose destroying fungi and bacteria. At the end of 30 days, the reduction in breaking strength of one-inch wide strips of fabric was measured.

Microbiological test for mildew resistance

In this test the mildew resistance of strips of treated cotton duck was determined by measuring their reduction in breaking strength after inoculation and incubation with the fungus *Chaetomium globosum*.

An inoculum of *Chaetomium globosum* was prepared by dispersing in water the scrapings from a ripe fruiting culture.

Into eight ounce square bottles was poured a culture medium prepared by mixing together and heating in an autoclave a mixture consisting of 3 grams of $NH_4NO_3$, 2 grams of $K_2HPO_4$, 2.5 grams of $KH_2PO_4$, 2 grams of $MgSO_4.7H_2O$, 20 grams of Bacto-agar, and 1.0 liter of water. After the bottles and their contents had been sterilized in an autoclave for 20 minutes at 15 pounds pressure and 120° C., they were placed on their sides. As they cooled, the agar hardened. A sterile piece of filter paper for the culture to feed upon was placed on top of the medium. Over its surface was spread 1 to 2 cc. of the inoculum of *Chaetomium globosum* prepared as described above. The bottles, thus prepared, were held at an incubation temperature of about 85° F. for 3 to 4 days, until a mycelial mat developed. On top of this mat was placed a sample of treated cotton duck, which had been leached in water for 24 hours in order to extract water-soluble preservatives that would be removed normally by rain or other weather conditions. Over this fabric, more inoculum was spread. After 14 more days at about 85° F. the fabric was removed, washed free of fungi, dried and tested for breaking strength.

*Water repellency test*

The water spray test, Standard Test Method 22–41, 1950 Technical Manual and Yearbook of the American Association of Textile Chemists and Colorists, was used for determining water repellency. In this test, a specimen stretched tightly in a six-inch embroidery hoop, is held at a 45° angle six inches below a standard spray head. After pouring 250 cc. of water through the spray head the fabric is rated with respect to its water repellency. Ratings are made on a scale of zero to 100 where zero represents complete wetting of upper and lower surfaces and 100 represents complete absence of wetting. A rating of 50 indicates complete wetting of upper fabric surface, 70 signifies partial wetting of upper surface, 80 represents partial wetting to give a sharp spray-head pattern, and 90 indicates slight random wetting of upper surface.

*Weathering test*

In this test, reduction of tensile strength is determined of samples of fabric that have been exposed to outside atmospheric conditions for 30 days.

EXAMPLE 1

A piece of 10 ounce cotton duck was immersed in an isopropyl alcohol solution containing 3 percent by weight of poly-2-methyl-5-vinylpyridine, prepared as described in Table A, for sufficient time to effect thorough wetting. The fabric was then removed, freed of excess solvent, and immersed in an aqueous solution of cupric sulfate, whereupon an insoluble reaction product of the polymer with the cupric sulfate was precipitated in and/or on the fabric. The fabric was then leached with water for 24 hours to remove any uncombined metal salt and thus eliminate its effect on the subsequent tests. The fabric was dried at 60° C. and tested by exposure to cultures of *Chaetomium globosum* for 14 days as described above. The tensile strength of the fabric at the end of this time was 46% of its original strength. By comparison the untreated fabric after the same exposure retained only 4½% of its original tensile strength.

EXAMPLE 2

A butadiene-methylvinylpyridine copolymer, prepared as described in Table A, was dissolved in a mixture of isopropyl alcohol, acetic acid, and water to form an aqueous solution containing 2% polymer, 10% acetic acid and 20% isopropyl alcohol (percent by weight). The method of preparing this solution was as follows: The polymer, cut in small pieces, was let stand about one day in contact with a mixture comprising one-half the total quantity of glacial acetic acid and isopropyl alcohol. At the end of this time, increments of the remaining alcohol and acid containing increasing amounts of water were added, with agitation, until the last addition was water alone.

A sample of 10 ounce cotton duck was immersed in this solution for a time sufficient to effect thorough wetting. After it had been squeezed between rollers to remove excess moisture, it was immersed in an aqueous solution of cupric sulfate. Following the removal of excess moisture, it was immersed in a dilute aqueous sodium bicarbonate solution in order to precipitate on and/or in the fabric the insoluble copolymer-copper salt complex. The fabric was then leached in water for 24 hours and dried at 60° C.

A sample of this fabric was leached in water for 24 hours to remove any residual metal salt. The sample was then tested for water repellency and resistance to deterioration caused by *Chaetomium globosum*, moist soil, and outdoor atmospheric conditions. They were found to be much superior to an untreated sample of fabric. Results are given in Table I below:

TABLE I

| | Tensile Strength [1] After— | | | | Water Repellency |
|---|---|---|---|---|---|
| | No Exposure | 30 Days Soil Burial | 30 Days Weathering | 14 Days' Exposure to *Chaetomium globosum* | |
| Treated Sample | 129 | 130 | 108 | 91 | 100 |
| Untreated Sample | 112 | 88 | 97 | 5 | 50 |

[1] Pounds pull per one inch width of test strip.

EXAMPLE 3

A copolymer of 1,3-butadiene and 2-methyl-5-vinylpyridine, prepared according to the recipe of Table A, was dissolved in an isopropyl alcohol-water HCl mixture to yield a solution comprising 1.5 percent by weight of polymer hydrochloride, 35 percent isopropyl alcohol, and the balance water. The following procedure was used to effect solution: The polymer, cut in small pieces, was let stand about one day in contact with concentrated hydrochloride acid and about one-half the total quantity of isopropyl alcohol. Sufficient hydrochloric acid was used to combine with all of the basic nitrogen atoms in the polymer. Water and the remaining alcohol were then added, with agitation, in increments containing increasing amounts of water, until the last addition was water alone.

A sample of 10 ounce cotton duck was immersed in this solution. After it had been squeezed between rollers to remove excess moisture, it was immersed in an aqueous solution of cupric chloride. An insoluble copolymer-copper salt complex was precipitated on and/or in the fabric. The fabric was then squeezed, immersed in dilute aqueous sodium bicarbonate solution, leached in water for 24 hours, and dried at 60° C.

Samples of this fabric when tested for mildew resistance by the method described above were found to have retained 96% of their original tensile strength as compared to a retention of only 4½% of original tensile strength by the untreated sample after the same test.

EXAMPLE 4

A sample of 10 ounce cotton duck was immersed in the solution of a copolymer of 1,3-butadiene and 2-methyl-5-vinylpyridine, prepared by the recipe of Table A. It was then squeezed, immersed in an aqueous solution of $ZnCl_2$, leached with water for 24 hours and dried at 60° C. An insoluble copolymer-zinc chloride complex was precipitated on and/or in the fabric.

Samples of this fabric when tested for mildew resistance by the method described above were found to have retained 81% of their original tensile strength as compared to a retention of only 4½% of original tensile strength by the untreated fabric after the same test.

EXAMPLE 5

A copolymer of 1,3-butadiene and 2-methyl-5-vinylpyridine, prepared according to the recipe of Table A, was dissolved by the method described in Example 2 to produce an aqueous solution containing 1.5% polymer, 5% acetic acid, and 10% alcohol (percent by weight). A sample of 10 ounce cotton duck was immersed in this solution. After it had been squeezed between rollers to remove excess moisture, it was immersed in an aqueous solution containing ½ mol of zinc acetate for each nitrogen atom in one mol of the polymer. Following removal of excess moisture, it was immersed in a dilute sodium bicarbonate solution in order to precipitate on and/or in the fabric the insoluble copolymer-zinc acetate reaction product. The fabric was then leached in water for 24 hours, and dried at 60° C.

Samples of this fabric when tested for mildew resistance by the method described above it was found to have retained 100% of its original tensile strength, as against 4½% for the untreated fabric under the same conditions.

EXAMPLE 6

Poly-2-methyl-5-vinylpyridine, prepared according to the recipe of Table A, was dissolved in an aqueous solution of hydrochloric acid in the proportion of 5 grams of polymer per 100 cc. of the solution. Sufficient hydrochloric acid was used to effect complete neutralization of the polymer. A sample of 10-ounce cotton duck was immersed in the polymer solution, squeezed to remove the excess solution, washed with 0.05 N sodium hydroxide solution, rinsed, leached in water for 24 hours, and dried at 60° C. After a soil burial test for 30 days duration, the fabric was severely attacked by fungus. It was only slightly better than the untreated fabric.

EXAMPLE 7

Poly-2-methyl-5-vinylpyridine was dissolved in an approximately 1.5% aqueous hydrochloric acid solution in the proportion of 5 grams of polymer/100 cc. of solution. A piece of 10-ounce cotton duck was immersed in the polymer solution, squeezed to remove excess solution, and then immersed in a saturated solution of mercuric chloride. (Prior to being immersed in mercuric chloride solution, a piece thus treated contains approximately 7 percent by weight of polymer based on the weight of the fabric.) By this method the complex of the acid salt of the polymer and the mercuric chloride was precipitated in the fabric. This complex contained 57.5 percent mercury by weight. The fabric was squeezed to remove excess mercuric chloride solution, leached with water for 24 hours, and dried at 60° C. It was buried in soil for 30 days at 30° C. The fabric retained its tensile strength and showed only very slight discoloration at the end of this period, thus demonstrating that it was highly resistant to the action of soil organisms. A separate piece which had been treated with the 2-methyl-5-vinylpyridine polymer and mercuric chloride was tested and found to be water repellent.

EXAMPLE 8

A sample of 50/50 butadiene/2-methyl-5-vinylpyridine copolymer was dissolved in an approximately 5% aqueous hydrochloric acid solution in the proportion of 1.5 grams of copolymer/100 cc. of solution. (A large excess of hydrochloric acid was used in order to facilitate solution of the copolymer.) A piece of 10-ounce cotton duck was immersed in the copolymer solution and then squeezed to remove the excess. Fabric thus treated contains approximately 2.2 percent by weight of polymer, based on the weight of the fabric. The fabric was then immersed in a saturated solution of mercuric chloride, squeezed to remove the excess, leached with water for 24 hours, and dried at 60° C. The complex of the acid salt of the polymer and the mercuric chloride contained 48 percent mercury by weight. Results of the soil burial test were the same as in Example 7. The fabric was also water repellent.

EXAMPLE 9

A sample of the 50/50 butadiene/2-methyl-5-vinylpyridine copolymer prepared as described in Table A was dissolved in aqueous acetic acid, mercuric acetate was added (an amount equivalent to one mol of mercuric acetate per pyridine nucleus in the copolymer), and the mixture was heated 15 minutes at 85° C. The final solution contained 1.5% copolymer, 15% acetic acid, and 2% mercuric acetate. A piece of 10-ounce cotton duck was immersed in this solution, squeezed to remove the excess, and then washed with 0.05 N sodium hydroxide, leached with water for 24 hours, and dried at 60° C. The mercurated polymer contained 40.2% mercury by weight. Results of the soil burial test were the same as (7) and (8) and the fabric was water repellent.

EXAMPLE 10

A piece of 10-ounce cotton duck was immersed in a saturated solution of mercuric chloride, squeezed to remove the excess solution, water leached, and dried. The fabric showed no water repellency. After the soil burial test, the fabric was disintegrated more than that of Example 6. It was attacked by fungus but not so severely as that of Example 6.

EXAMPLE 11

An untreated piece of 10-ounce cotton duck was subjected to the soil burial test. At the end of 30 days there was severe tendering of the fabric, i. e., it showed a substantial amount of disintegration. It could not be removed from the soil in one piece. It was severely attacked by fungus.

EXAMPLE 12

In order to demonstrate that it is the mercury in the polymeric product which prevents fungus attack, pieces of absorbent paper were immersed in an 8 percent solution of poly-2-methyl-5-vinylpyridine which had been 85 percent neutralized with hydrochloric acid. While these papers were still wet they were immersed in a saturated solution of mercuric chloride to precipitate the mercuric chloride-polymer hydrochloric complex. Fungicidal activity was determined by an infected wheat test in which wheat infected principally with *Helminthosporum sativum* was placed upon the paper. The test was made upon freshly prepared paper, paper soaked over night in water, paper exposed out of doors for one week, and paper impregnated with the polymer hydrochloric containing no mercury. In each case 10 infected seeds were placed upon the paper and the seeds were incubated for 15 days in a constant temperature atmosphere. Results of these tests are tabulated below:

| Treatment on Paper | Readings at 15 days, 70° F. | |
|---|---|---|
| | Moldy Seeds | Mold Spots on Paper |
| Original Mercury Complex | 0 | 0 |
| Mercury Complex and soaked over night in water | 0 | 0 |
| Mercury Complex Weathered for one week | 0 | 0 |
| Polymer Hydrochloride | 10 | 10 |
| Control—No Treatment | 10 | 10 |

The amount of mercury present in the polymeric material may vary between wide limits. This mercury should comprise from 5 to 58% (preferably 10–58%) by weight of the polymeric treating material, and preferably the mercuric salt reaction product with the pyridine derivative polymer should contain at least 30 percent mercury by weight. As previously stated, the other metals should comprise at least 5% by weight of the polymeric treating material.

As many possible embodiments may be made of this invention without departing from the scope thereof it is to be understood that all matter herein set forth is to be interpreted as illustrative and not in a limiting sense.

I claim:

1. The method of preparing an impregnant for absorbent material comprising preparing a solution of a polymer of a monomer system comprising a compound having a structure selected from the group consisting of

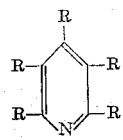

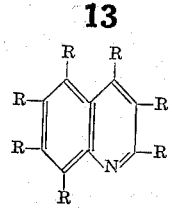

and

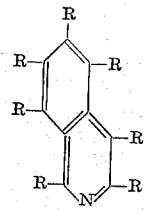

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; and mixing a solution of a heavy metal salt with said polymer solution to produce a water-insoluble addition product of the salt with the polymer, said product containing at least 5% metal by weight.

2. Process of claim 1 wherein the metal is selected from the group consisting of mercury, copper, zinc, chromium, and cadmium.

3. The method of preparing an impregnant for absorbent material comprising preparing an acid solution of a polymer of a monomer system comprising a compound having a structure selected from the group consisting of

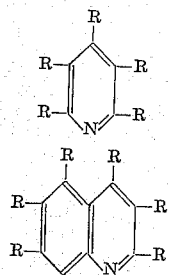

and

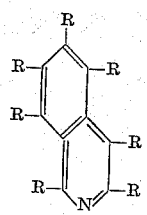

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; and mixing the resulting solution with a mercuric salt solution, whereby a water-insoluble addition product of the polymer with the mercury salt is formed, said product containing 10–58% mercury by weight.

4. Process of claim 3 wherein the acid is HCl, the mercuric salt is selected from the group consisting of mercuric chloride and mercuric nitrate, and said polymer is a polymerizate of a monomer system comprising 2-methyl-5-vinylpyridine.

5. Process of claim 3 wherein the acid is aqueous acetic acid, the mercuric salt is mercuric acetate, said polymer is a polymerizate of a monomer system comprising 1,3-butadiene and 2-methyl-5-vinylpyridine, and the reaction product is precipitated with an alkaline reagent.

6. As a new composition of matter, the reaction product of a solution of a heavy metal salt with a solution of a polymer of a monomer system comprising a compound having a structure selected from the group consisting of

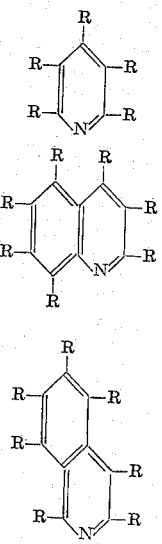

and

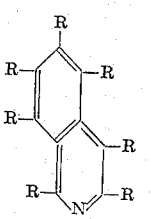

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; the resulting product being water-insoluble and containing at least 5% metal by weight.

7. Composition of claim 6 wherein the metal is selected from the group consisting of copper, mercury, zinc, chromium, and cadmium.

8. As a new composition of matter, the reaction product of a mercuric salt with a polymer of a monomer system comprising a compound having a structure selected from the group consisting of

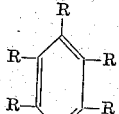
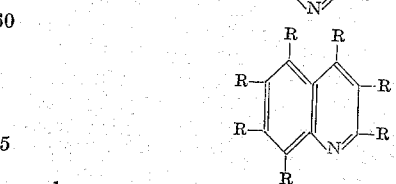

and

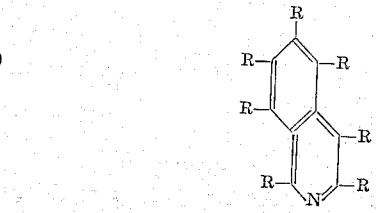

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; the reaction being carried out in the presence of an acidic solution, the reaction product being water-insoluble and containing 10 to 58 percent mercury by weight.

9. The composition of claim 8 in which said mercuric salt is mercuric acetate and said acid is acetic acid.

10. The composition of claim 8 in which said mercuric salt is selected from the group consisting of mercuric chloride and mercuric nitrate and said acid is hydrochloric acid.

11. The method of rendering absorbent material water repellent and resistant to attack by parasitic microorganisms comprising impregnating said material with the reaction product of a solution of a heavy metal salt and a solution of a polymer of a monomer system comprising a compound having a structure selected from the group consisting of

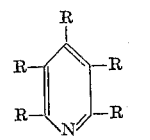

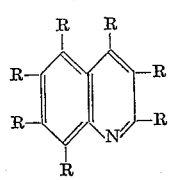

and

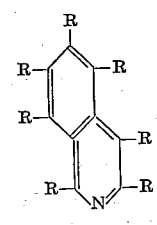

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; the reaction product containing at least 5% metal by weight, whereby from 0.1 to 25 parts by weight of water-insoluble reaction product is deposited per 100 parts by weight of the dry absorbent.

12. A method of rendering absorbent material water repellent and resistant to attack by parasitic microorganisms according to claim 11 wherein said heavy metal is selected from the group consisting of mercury, copper, zinc, chromium and cadmium.

13. The method of rendering absorbent material water repellent and resistant to attack by parasitic microorganisms, comprising contacting said material with an acid solution of a polymer of a monomer system comprising a compound having a structure selected from the group consisting of

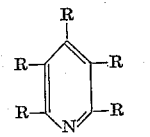

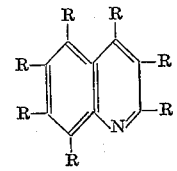

and

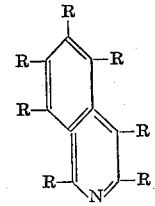

where R is selected from the group consisting of hydrogen, alkyl, vinyl, alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; contacting said material thereafter with a solution of a mercuric salt, thereby precipitating from 0.5 to 5 parts by weight of a water-insoluble mercuric salt-polymer addition product in said material per 100 parts by weight of dry material, and rinsing and drying the treated material.

14. An absorbent article impregnated with the reaction product of a heavy metal salt and a polymer of a monomer system comprising a compound having a structure selected from the group consisting of

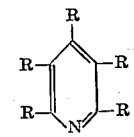

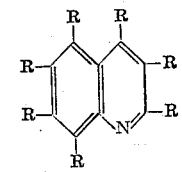

and

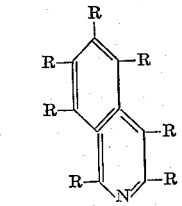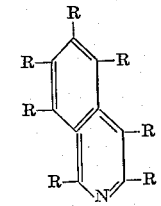

where R is selected from the group consisting of hydrogen, alkyl, vinyl alpha-methylvinyl, nitro, alkoxy, halo, hydroxy, cyano, aryloxy, aryl, haloalkyl, alkylaryl, and hydroxyaryl, at least one and not more than two of said groups being selected from the group consisting of vinyl and alpha-methylvinyl; and the total number of carbon atoms in the nuclear substituted groups being not greater than 12, in addition to those carbon atoms in the vinyl and alpha-methylvinyl groups; said reaction product containing at least 5% metal by weight and being deposited in an amount of 0.1–25 parts by weight per 100 parts by weight of dry absorbent.

15. An article of claim 14 wherein said heavy metal is selected from the group consisting of mercury, copper, zinc, chromium and cadmium.

16. An article of claim 14 wherein said heavy metal is copper and said polymer is a copolymer of 1,3-butadiene and 2-methyl-5-vinylpyridine.

17. An article of claim 14 wherein said heavy metal is zinc and said polymer is a copolymer of 1,3-butadiene and 2-methyl-5-vinylpyridine.

18. An absorbent article impregnated with the reaction product of a mercuric salt and a substituted pyridine polymer, at least one and not over two substituent groups being vinyl, any additional substituents being alkyl radicals selected from the group consisting of methyl and ethyl radicals, said reaction being carried out in the presence of an acidic solution, said reaction product being water-insoluble and containing 10–58% mercury by weight based on the weight of dry absorbent, the impregnant being deposited in an amount of 0.5–5 parts by weight per 100 parts by weight of absorbent and functioning to render the article water repellent and resistant to fungi and insects.

19. The article of claim 18 in which said polymer is prepared from a monomeric mixture containing a vinylpyridine and not over 75 parts by weight, per 100 parts of monomers, of a copolymerizable conjugated diene.

20. The article of claim 18 in which said polymer is prepared by polymerizing a mixture containing 0 to 75 parts by weight of butadiene and 100 to 25 parts by weight of 2-methyl-5-vinylpyridine per 100 parts of total monomers.

21. As a new composition of matter, the reaction product of a mercuric salt with a polymer of a monomer system comprising a substituted pyridine base monomer, at least one and not more than two substituent groups being selected from the group consisting of vinyl and alpha-methylvinyl, any additional substituents being alkyl radicals having in combination a total of not more than 12 carbon atoms, the reaction being carried out in the presence of an acidic solution, and the resulting product containing 10 to 58 percent mercury by weight.

22. The method of preparing an absorbent material treating agent which comprises preparing an acid solution of a polymer of a monomer system comprising a substituted pyridine base monomer, at least one and not more than two substituent groups being selected from the group consisting of vinyl and alpha-methylvinyl, any additional substituents being alkyl radicals having in combination a total of not more than 12 carbon atoms, contacting the resulting solution with a solution of mercuric salt, and recovering the resulting product, said product containing 10 to 58 percent mercury by weight.

23. The method of rendering absorbent material resistant to attack by bacteria, fungi, insects and their larva, which comprises impregnating said material with the reaction product of a mercuric salt and a polymer of a monomer system comprising a substituted pyridine base monomer, at least one and not over two substituent groups being selected from the group consisting of vinyl and alpha-methylvinyl, any additional substituents being alkyl radicals having in combination a total of not more than 12 carbon atoms, said reaction being carried out in the presence of an acidic solution, the reaction product containing 10 to 58 percent mercury by weight.

References Cited in the file of this patent

UNITED STATES PATENTS

| | | |
|---|---|---|
| 2,390,408 | Young | Dec. 4, 1945 |
| 2,471,261 | Cook | May 4, 1949 |
| 2,487,829 | Richards | Nov. 15, 1949 |
| 2,604,668 | Miller | July 29, 1952 |
| 2,658,850 | Cislak | Nov. 10, 1953 |
| 2,702,763 | Pritchard | Feb. 22, 1955 |
| 2,751,323 | Pritchard et al. | June 19, 1956 |
| 2,767,159 | Potts | Oct. 16, 1956 |